United States Patent
Rasbornig et al.

(10) Patent No.: US 12,163,782 B2
(45) Date of Patent: Dec. 10, 2024

(54) ANGLE SENSOR WITH DIVERSE MEASUREMENT PATHS AND A SAFETY PATH

(71) Applicant: Infineon Technologies AG, Neubiberg (DE)

(72) Inventors: Friedrich Rasbornig, Klagenfurt (AT); Wolfgang Granig, Seeboden (AT); Dirk Hammerschmidt, Finkenstein (AT); Benjamin Kollmitzer, Pörtschach (AT); Bernhard Schaffer, Villach (AT)

(73) Assignee: Infineon Technologies AG, Neubiberg (DE)

( * ) Notice: Subject to any disclaimer, the term of this patent is extended or adjusted under 35 U.S.C. 154(b) by 47 days.

(21) Appl. No.: 17/303,191

(22) Filed: May 24, 2021

(65) Prior Publication Data
US 2022/0373318 A1    Nov. 24, 2022

(51) Int. Cl.
*G01B 7/30* (2006.01)
*G01D 5/12* (2006.01)

(52) U.S. Cl.
CPC ........ *G01B 7/30* (2013.01); *G01D 5/12* (2013.01)

(58) Field of Classification Search
CPC ..................................... G01B 7/30; G01D 5/12
See application file for complete search history.

(56) References Cited

U.S. PATENT DOCUMENTS

| | | | | |
|---|---|---|---|---|
| 7,064,538 B2* | 6/2006 | Kernhof | ............ | G01D 5/24404 324/207.2 |
| 9,346,441 B2* | 5/2016 | Rasbornig | ............ | G01D 3/08 |
| 9,638,762 B2* | 5/2017 | Scherr | ............ | G01R 33/093 |
| 2005/0278137 A1* | 12/2005 | Hammerschmidt | | G01D 5/2448 702/151 |
| 2009/0188120 A1* | 7/2009 | Steinich | ............ | G01D 3/08 324/123 R |
| 2009/0319120 A1* | 12/2009 | Hatanaka | ............ | B62D 15/0215 701/29.2 |
| 2018/0356253 A1* | 12/2018 | Hammerschmidt | ... | G01D 5/145 |

FOREIGN PATENT DOCUMENTS

| CN | 106546273 | * 3/2017 | ............. G01D 5/245 |
|---|---|---|---|
| DE | 102016102927 | * 8/2016 | ............. G01D 18/00 |
| WO | WO2018234832 | * 12/2018 | ............. B60R 25/00 |

* cited by examiner

*Primary Examiner* — Alexander Satanovsky
*Assistant Examiner* — Sharah Zaab
(74) *Attorney, Agent, or Firm* — Harrity & Harrity, LLP

(57) ABSTRACT

An angle sensor may include a first angle measurement path to determine an angular position based on sensor values from a first set of sensing elements. The angle sensor may include a second angle measurement path to determine the angular position based on sensor values from a second set of sensing elements. A type of the second set of sensing elements is different from a type of the first set of sensing elements. The angle sensor may include a safety path to perform a set of safety checks, the set of safety checks including a first vector length check associated with the first angle measurement path and a second vector length check associated with the second angle measurement path. The angle sensor may include an output component to provide an indication of a result of the set of safety checks.

20 Claims, 16 Drawing Sheets

ANGLE SENSOR WITH DIVERSE MEASUREMENT PATHS AND A SAFETY PATH

BACKGROUND

An angle sensor may include a set of sensing components that sense a strength of different components (e.g., an x-component and a y-component) of a magnetic field produced or distorted by a target object. The angle sensor may determine an angular position of the target object based on the strength of the components of the magnetic field, and may provide an output that indicates the angular position as determined by the angle sensor.

SUMMARY

In some implementations, an angle sensor includes a first angle measurement path to determine an angular position based on sensor values from a first set of sensing elements; a second angle measurement path to determine the angular position based on sensor values from a second set of sensing elements, a type of the second set of sensing elements being different from a type of the first set of sensing elements; a safety path to perform a set of safety checks, the set of safety checks including: a first vector length check associated with the first angle measurement path, and a second vector length check associated with the second angle measurement path; and an output component to provide an indication of a result of the set of safety checks.

In some implementations, a device includes a first angle measurement path to determine a first angular position, the first angle measurement path including a first set of magnetoresistive (MR) sensing elements; a second angle measurement path to determine a second angular position, the second angle measurement path including either a set of Hall-based sensing elements or a second set of MR sensing elements; a safety path to at least one of: perform a first vector length check for sensor values on the first angle measurement path, or perform a second vector length check for sensor values on the second angle measurement path; and an output component to provide an indication of a result of the first vector length check or the second vector length check.

In some implementations, a method includes determining, by a system, a first angular position based on sensor values associated with a first set of sensing elements on a first angle measurement path; determining, by the system, a first vector length based on the sensor values associated with the first set of sensing elements; determining, by the system, a second angular position based on sensor values associated with a second set of sensing elements on a second angle measurement path, wherein a measurement range of the second set of sensing elements is different from a measurement range of the first set of sensing elements; determining, by the system, a second vector length based on the sensor values associated with the second set of sensing elements; and performing, by the system, a set of safety checks, the set of safety checks including at least one of: a first vector length check associated with the first vector length, a second vector length check associated with the second vector length, or a comparison check associated with the first angular position and the second angular position.

DETAILED DESCRIPTION

Figure 1A:
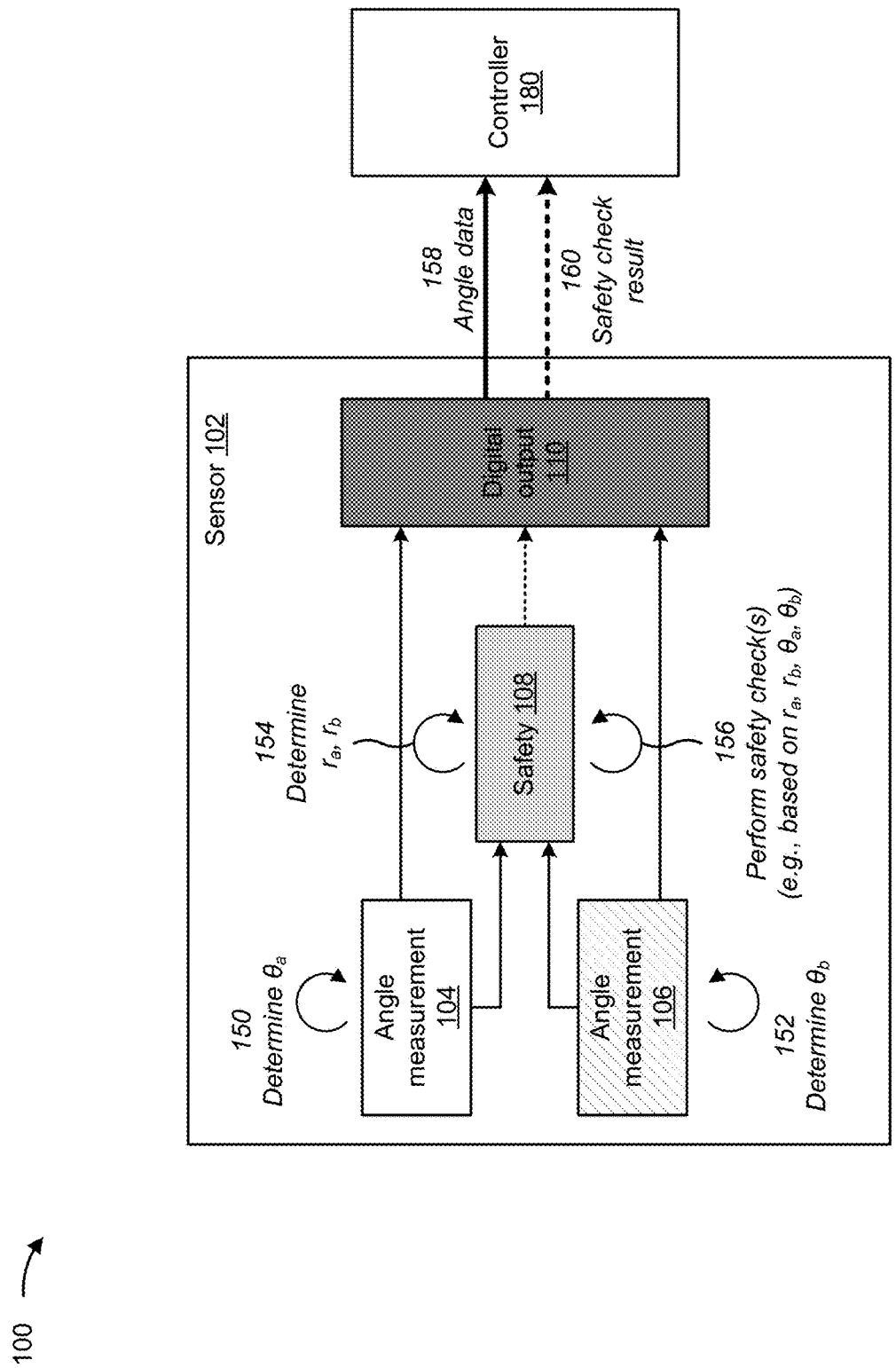
FIGS. 1A and 1B are diagrams associated with example operations of a system comprising an angle sensor with diverse angle measurement paths and a safety path, as described herein.

The following detailed description of example implementations refers to the accompanying drawings. The same reference numbers in different drawings may identify the same or similar elements.

An angle sensor may be designed to determine an angular position of a target object (e.g., a rotatable object) in a given application. For example, an angle sensor may be used in an electronic power steering (EPS) application to determine an angular position of a steering column. In some applications, it may be necessary to ensure functional safety of the angle sensor.

In general, functional safety can be defined as an absence of unreasonable risk (e.g., to a system, to an environment, to people, and/or the like) due to hazards caused by malfunctioning behavior (e.g., a systematic failure, a random failure, or the like) of the angle sensor. In the automotive context, an Automotive Safety Integrity Level (ASIL) scheme is used to dictate functional safety requirements for an angle sensor. The ASIL scheme is a risk classification scheme defined by the International Organization for Standardization (ISO) 26262 standard (titled Functional Safety for Road Vehicles), which provides a standard for functional safety of electrical and/or electronic systems in production automobiles. An ASIL classification defines safety requirements necessary to be in line with the ISO 26262 standard. An ASIL is established by performing a risk analysis of a potential hazard by looking at severity, exposure, and controllability of a vehicle operating scenario. A safety goal for that hazard in turn guides the ASIL requirements. There are four ASILs identified by the standard: ASIL A, ASIL B, ASIL C, ASIL D. ASIL D dictates the highest integrity requirements, while ASIL A dictates the lowest. A hazard with a risk that is low (and, therefore, does not require safety measures in accordance with ISO 26262) is identified as quality management (QM). In some cases, it is desirable or required that an angle sensor achieves a high ASIL. For example, it may be desirable or required that an angle sensor used in a given application achieves ASIL B, ASIL C, or ASIL D. To ensure functional safety in an angle sensor, a safety mechanism that allows malfunctioning behavior to be identified and signaled should be implemented.

Some implementations described herein provide an angle sensor with diverse angle measurement paths and a safety path. In some implementations, the angle sensor includes a first angle measurement path to determine an angular position based on sensor values from a first set of sensing elements, and a second angle measurement path to determine the angular position based on sensor values from a second set of sensing elements. Here, the first and second sets of sensing elements are different types of sensing elements, meaning that the first angle measurement path and the second angle measurement path are diverse measurement paths. For example, the first set of sensing elements may be a set of magnetoresistive (MR) sensing elements (e.g., a set of anisotropic magnetoresistance (AMR) elements, giant magnetoresistance (GMR) elements, tunnel magnetoresistance (TMR) elements, or the like) and the second set of sensing elements may be a set of Hall-based sensing elements (e.g., a set of sensing elements that operate based on the Hall effect). The use of diverse angle measurement paths provides both redundancy of angle measurement and diversity of sensing principle, thereby improving functional safety of the angle sensor (e.g., as compared to an angle sensor with only one sensor path or an angle sensor with redundant sensor paths that use the same sensing principle).

The angle sensor additionally includes a safety path to perform a set of safety checks associated with the first angle measurement path and/or the second angle measurement path. The set of safety checks can include, for example, a first vector length check associated with the first angle measurement path, a second vector length check associated with the second angle measurement path, or a comparison check associated with the first angle measurement path and the second angle measurement path. In some implementations, the safety path enables a failure (e.g., in the first angle measurement path or in the second angle measurement path) path to be detected, thereby improving functional safety of the angle sensor.

Figure 1B:
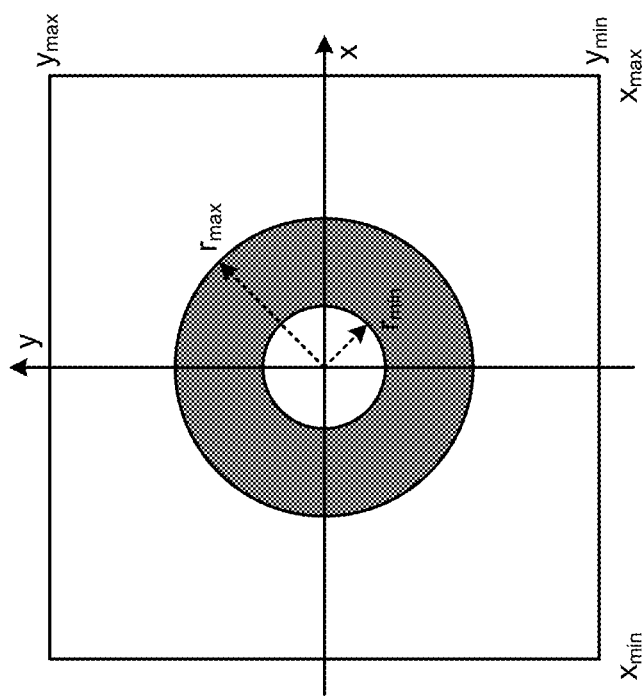

FIGS. 1A and 1B are diagrams associated with example operations of a system 100 comprising an angle sensor 102 with diverse angle measurement paths and a safety path, as described herein. As shown in FIG. 1A, the system 100 includes a sensor 102 comprising an angle measurement path 104, an angle measurement path 106, a safety path 108, and a digital output component 110. As further shown, the system 100 includes a controller 180. The components of the system 100 are described below, followed by a description of an example operation of the system 100. In some implementations, the first angle measurement path 104, the second angle measurement path 106, and the safety path 108 are integrated on a monolithic semiconductor device (e.g., a single chip).

An angle measurement path (e.g., the angle measurement path 104, the angle measurement path 106) includes one or more components associated with determining an angular position θ (theta) of a target object (not shown) based on a set of sensor values. For example, the set of sensor values can include a value of a signal indicating a y-component of the angular position θ (also referred to as a sine value) and a value of a signal indicating an x-component of the angular position θ (also referred to a cosine value). Here, a given angle measurement path may determine an angular position θ of the target object based on the y-component and the x-component (e.g., by calculating an arctangent of the y-component divided by the x-component).

In some implementations, the angle measurement path 104 and the angle measurement path 106 utilize different types of sensing elements, meaning that the angle measurement path 104 and the angle measurement path 106 are diverse measurement paths. In some implementations, a measurement range on the first angle measurement path 104 is different from a measurement range on the second angle measurement path 106. Additional details regarding example implementations of the angle measurement path 104 and the angle measurement path 106 are provided below with respect to FIGS. 2A-2H.

The safety path 108 includes one or more components associated with performing one or more safety checks associated with the angle sensor 102. In some implementations, the one or more safety checks include a vector length check associated with the angle measurement path 104. In some implementations, the one or more safety checks include a vector length check associated with the angle measurement path 106. In some implementations, the one or more safety checks include a comparison check associated with the angular position θ as determined on the angle measurement path 104 and the angular position θ as determined on the angle measurement path 106.

In some implementations, as shown in FIG. 1A, the safety path 108 is configured to receive sensor values from the angle measurement path 104, sensor values from the angle measurement path 106, information associated with a vector length $r_a$ associated with the sensor values from the angle measurement path 104, information associated with a vector length $r_b$ associated with the sensor values from the angle measurement path 106, information associated with the angular position $θ_a$ determined on the angle measurement path 104, information associated with the angular position $θ_b$ determined in the angle measurement path 106, and/or one or more items of information in association with performing the one or more safety checks, as described herein. In some implementations, the safety path 108 is configured to provide a safety indication (e.g., a failure indication, an error indication, a deactivation indication, an OK indication, or the like) to the digital output component 110.

The digital output component 110 includes one or more components associated with generating and transmitting one or more outputs (e.g., an output carrying sensor data, an output carrying an indication of a result of the one or more safety checks, or the like). In some implementations, as shown in FIG. 1A, the digital output component 110 may receive one or more signals from the angle measurement path 104, the angle measurement path 106, and the safety path 108, and may generate and transmit the one or more outputs accordingly. In some implementations, the digital output component 110 transmits the one or more outputs to the controller 180.

The controller 180 includes one or more components associated with controlling one or more electrical systems and/or electrical subsystems based on information provided by the sensor 102. The controller 180 may include, for example, a microcontroller (pc) or an electronic control unit (ECU), among other examples. In some implementations, the controller 180 may be capable of calibrating, controlling, adjusting, and/or the like, the one or more electrical systems and/or electrical subsystems based on information received from the sensor 102. For example, in some implementations, the controller 180 may be configured to determine an angular position θ of the target object and/or one or more other items of information (e.g., a rotational speed of the target object, a rotational direction of the target object, or the like), determine information associated with the one or more safety checks for the sensor 102, and/or provide such information or perform one or more operations in association with controlling the one or more electrical systems and/or electrical subsystems based on such information. In some implementations, the controller 180 is connected to the sensor 102 such that the controller 180 can receive information (e.g., one or more signals) from the sensor 102 via one or more transmission interfaces and/or via one or more output terminals.

An example operation of the system 100 is illustrated in FIG. 1A. As shown by reference 150, the angle measurement path 104 determines an angular position $\theta_a$. In some implementations, the angle measurement path 104 determines the angular position $\theta_a$ based on sensor values provided by the set of sensing elements on the angle measurement path 104 (e.g., a set of MR sensing elements, such as a set of AMR sensing elements). In some implementations, the angle measurement path 104 provides one or more signals to the safety path 108. The one or more signals provided by the angle measurement path 104 to the safety path 108 may include, for example, one or more signals indicating the sensor values from the angle measurement path 104, a vector length $r_a$ computed from the sensor values (e.g., when the angle measurement path 104 is configured to compute the vector length $r_a$), and/or the angular position $\theta_a$. Further, in some implementations, the angle measurement path 104 provides a signal indicating the angular position $\theta_a$ to the digital output component 110.

As shown by reference 152, the angle measurement path 106 determines an angular position $\theta_b$. In some implementations, the angle measurement path 106 determines the angular position $\theta_b$ based on sensor values provided by the set of sensing elements on the angle measurement path 106 (e.g., a set of Hall-based sensing elements or a set of MR sensing elements, such as a set of GMR sensing elements or TMR sensing elements). In some implementations, the angle measurement path 106 provides one or more signals to the safety path 108. The one or more signals provided by the angle measurement path 106 to the safety path 108 may include, for example, one or more signals indicating the sensor values from the angle measurement path 106, a vector length $r_b$ computed from the sensor values (e.g., when the angle measurement path 106 is configured to compute the vector length $r_b$), and/or the angular position $\theta_b$. Further, in some implementations, the angle measurement path 106 provides a signal indicating the angular position $\theta_b$ to the digital output component 110.

As shown by reference 154, the safety path 108 determines the vector length $r_a$ associated with the angle measurement path 104 and the vector length $r_b$ associated with the angle measurement path 106. In some implementations, the safety path 108 determines the vector length $r_a$ by receiving an indication of the vector length $r_a$ from the angle measurement path 104, as described above (e.g., when the angle measurement path 104 is configured to compute the vector length $r_a$). Alternatively, in some implementations, the safety path 108 determines the vector length $r_a$ by computing the vector length $r_a$ based on the sensor values received from the angle measurement path 104. Similarly, the safety path 108 determines the vector length $r_b$ by receiving an indication of the vector length $r_b$ from the angle measurement path 106, as described above (e.g., when the angle measurement path 106 is configured to compute the vector length $r_b$). Alternatively, in some implementations, the safety path 108 determines the vector length $r_b$ by computing the vector length $r_b$ based on the sensor values received from the angle measurement path 106.

In some implementations, a given vector length r (e.g., the vector length $r_a$, the vector length $r_b$) is determined using the following equation:

$$r=\mathrm{sqrt}(X^2+Y^2)$$

where X is the x-component of the angular position $\theta$, and Y is the y-component of the angular position $\theta$. That is, the vector length r corresponds to a magnitude of the electrical vector, whose elements are given by the x-component (cosine) channel and the y-component (sine) channel of a given angle measurement path. Notably, the vector length r is independent of the angular position $\theta$.

As shown by reference 156, the safety path 108 performs one or more safety checks. In some implementations, each safety check performed by the safety path 108 is based on the vector length $r_a$, the angular position $\theta_a$, the vector length $r_b$, and/or the angular position $\theta_b$.

In some implementations, the one or more safety checks include one or more vector length checks. For example, the one or more safety checks may include a vector length check associated with the vector length $r_a$ and/or a vector length check associated with the vector length $r_b$. In an ideal scenario, a given vector length r (e.g., the vector length $r_a$, the vector length $r_b$) remains constant during operation of the sensor 102 (e.g., due to the principle that $\cos^2\theta+\sin^2\theta=1$). If, for example, a sensor channel (e.g., the x-component channel or the y-component channel) of a given angle measurement path (e.g., the angle measurement path 104 or the angle measurement path 106) experiences a stuck-at fault, the vector length r will change as function of the angle $\theta$. This change in the vector length r can detected by the vector length check performed by the safety path 108. Therefore, when performing the vector length check, the safety path 108 determines whether the vector length r stays within an allowable vector length range (e.g., a vector length range defined by a minimum vector length $r_{min}$ and a maximum vector length $r_{max}$). FIG. 1B is a diagram illustrating a visualization of a vector length check. In the visualization shown in FIG. 1B, the vector length check is a determination of whether the vector length r is within the shaded region defined by the minimum vector length $r_{min}$ and the maximum vector length $r_{max}$.

Notably, digital signal processing performed by the sensor 102 can provide compensation for imperfections of components of the sensor 102 (e.g., the set of sensing elements, one or more analog-to-digital converters (ADCs), or the like). For example, a digital signal processor (DSP) of the sensor 102 may receive raw (i.e., uncompensated) sensor values as input, perform compensation, and output compensated sensor values. Parameters for this compensation can be based on calibration and/or autocalibration. For example, offsets of the raw sensor values can drift with temperature. Here, relevant parameters to compensate such drifts can be determined during end-of-line testing (i.e., calibration) and stored in a memory (e.g., a non-volatile memory) of the sensor 102. These parameters can then be used during operation of the sensor 102 for providing compensation, which leads to reduced offsets of the compensated sensor values over temperature. Notably, a well-compensated angle measurement path shows negligible variation in amplitude of sensor values and, therefore, the vector length r associated with the given angle measurement path may be independent of temperature. Additionally, for saturated sensing elements (e.g., MR sensing elements), the vector length r does not depend significantly on a magnitude of the magnetic field. In some implementations, the minimum vector length $r_{min}$ and the maximum vector length $r_{max}$ can be determined based on taking such variations and margins into consideration. That is, the allowable vector length range can be smaller for a well-compensated sensor 102 (e.g., as compared to an angle sensor with no or poor compensation), thereby improving functional safety of the sensor 102.

In some implementations, the minimum vector length $r_{min}$ and the maximum vector length $r_{max}$ are stored in the memory of the sensor 102 (e.g., after calibration). During operation, the safety path 108 compares the computed vector length r to the stored minimum vector length $r_{min}$ and maximum vector length $r_{max}$. Here, if the vector length r is not within the allowable vector length range (i.e., if the computed vector length is less than the minimum vector length $r_{min}$ or is greater than the maximum vector length $r_{max}$), then the safety path 108 may, for example, signal an error to the digital output component 110.

In some implementations, the safety path 108 performs a vector length check associated with the angle measurement path 104. That is, the safety path 108 may determine whether the vector length $r_a$ is within an allowable vector length range. Additionally, or alternatively, in some implementations, the safety path 108 performs a vector length check associated with the angle measurement path 106. That is, the safety path 108 may determine whether the vector length $r_b$ is within an allowable vector length range (e.g., the same allowable vector length range as used for the check of the vector length $r_a$ or a different allowable vector length range than that used for the check of the vector length $r_a$).

In some implementations, the one or more safety checks include a comparison check associated with the angular position $\theta_a$ and the angular position $\theta_b$. In some implementations, the safety path 108 performs the comparison check by determining whether the angular position $\theta_a$ (e.g., the angular position determined on the angle measurement path 104) matches the angular position $\theta_b$ (e.g., the angular position determined on the angle measurement path 106). That is, the safety path 108 may perform the comparison check by determining whether a difference between the angular position $\theta_a$ and the angular position $\theta_b$ is less than a threshold value (e.g., a tolerance value). In some implementations, information indicating the threshold may be stored on the memory of the sensor 102. During operation, the safety path 108 compares the computed difference between the angular position $\theta_a$ and the angular position $\theta_b$ to the threshold. Here, if the difference does not satisfy (e.g., is greater than) the threshold, then the safety path 108 may, for example, signal an error to the digital output component 110.

In some implementations, the safety path 108 provides information indicating a result of the one or more safety checks to the digital output component 110. For example, as indicated above, the safety path 108 may provide an indication of an error associated with the vector length check associated with the angle measurement path 104, an error associated with the vector length check associated with the angle measurement path 106, and/or an error associated with the comparison check. As another example, the safety path 108 may provide an indication that a given safety check has passed (e.g., an indication that the angle measurement path 104 has passed the vector length check, an indication that the angle measurement path 106 has passed the vector length check, and/or an indication that the angle measurement paths 104/106 have passed the comparison check).

Returning to FIG. 1A, as shown by references 158 and 160, the digital output component 110 may provide angle data and an indication of a result of the one or more safety checks to the controller 180. In some implementations, the angle data includes an indication of the angular position $\theta_a$ and/or an indication of the angular position $\theta_b$. In some implementations, the indication of the result of the one or more safety checks may include an indication of whether a given safety check has failed or passed. Alternatively, in some implementations, the indication of the result of the safety check may include an indication that a given safety check has failed (i.e., the digital output component 110 may provide an indication for the given safety check only when the given safety check fails).

As indicated above, FIGS. 1A and 1B are provided as examples. Other examples may differ from what is described with regard to FIGS. 1A and 1B. Further, the number and arrangement of components shown in FIG. 1A are provided as an example. In practice, there may be additional components, fewer components, different components, or differently arranged components than those shown in FIG. 1A. Furthermore, two or more components shown in FIG. 1A may be implemented within a single component, or a single component shown in FIG. 1A may be implemented as multiple, distributed components. Additionally, or alternatively, a set of components (e.g., one or more components) shown in FIG. 1A may perform one or more functions described as being performed by another set of components shown in FIG. 1A.

FIGS. 2A-2H are diagrams of example implementations of the system 100 comprising the angle sensor 102 including diverse measurement paths 104/106 and a safety path 108, as described herein. In FIGS. 2A-2H, components of the angle measurement path 104 are indicated by a white color, components of the angle measurement path 106 are indicated by a hatched pattern, components of the safety path 108 are indicated by a light gray color, and the digital output component is indicated by a dark gray color. Additionally, the safety path 108 includes one or more vector length check components 212 (e.g., a vector length check component 212a, a vector length check component 212b), and an angle comparison component 214.

Generally, as illustrated in FIGS. 2A-2H for example, the angle measurement path 104 includes a set of sensing elements 202 (e.g., a sensing element 202x for sensing the x-component of a magnetic field and a sensing element 202y for sensing the y-component of the magnetic field), one or more ADCs 206a, a DSP 208a, and an angle calculation component 210a. Similarly, the angle measurement path 106 includes a set of sensing elements 204 (e.g., a sensing element 204x for sensing the x-component of a magnetic field and a sensing element 204y for sensing the y-component of the magnetic field), one or more ADCs 206b, a DSP 208b, and an angle calculation component 210b.

A set of sensing elements (e.g., the set of sensing elements 202 or the set of sensing elements 204) is a set of components for sensing a magnetic field at the angle sensor 102. In some implementations, as described above, each set of sensing elements 202/204 includes a sensing element 202/204 configured to sense an x-component of the magnetic field and a sensing element 202/204 configured to sense a y-component of the magnetic field. In some implementations, a given set of sensing elements 202/204 may include MR sensing elements, which are elements comprised of a magnetoresistive material (e.g., nickel-iron (NiFe)), where an electrical resistance of the magnetoresistive material depends on a strength and/or a direction of the magnetic field present at the magnetoresistive material. Here, the given set of sensing elements 202/204 may operate based on an AMR effect, a GMR effect, or a TMR effect, among other examples. Further, in some implementations, a given set of sensing elements 202/204 may include a set of Hall-based sensing elements that operate based on the Hall effect. In some implementations, a given sensing element 202/204 may provide an analog signal, corresponding to a strength of a component of the magnetic field, to ADC 320.

As described above, the angle measurement path 104 and the angle measurement path 106 are diverse measurement paths. Thus, the set of sensing elements 202 on the angle measurement path 104 may in some implementations include a set of MR sensing elements (e.g., a set of AMR elements, a set of GMR elements, or a set of TMR elements, among other examples), while the set of sensing elements 204 on the angle measurement path 106 may include a set of Hall-based sensing elements (e.g., a set of sensing elements that operate based on the Hall effect). As another example, the set of sensing elements 202 on the angle measurement path 104 may in some implementations include a first set of MR sensing elements (e.g., a set of AMR elements), while the set of sensing elements 204 on the angle measurement path 106 may include a second set of MR elements (e.g., a set of GMR elements or a set of TMR elements, among other examples). In some implementations, the measurement range provided by the set of sensing elements 202 is different from the measurement range provided by the set of sensing elements 204. For example, the measurement range provided by the set of sensing elements 202 may be 180 degrees (°) (e.g., when the set of sensing elements 202 is a set of AMR sensing elements), while the measurement range provided by the set of sensing elements 204 may be 360° (e.g., when the set of sensing elements 204 is a set of GMR sensing elements, a set of TMR sensing elements, a set of Hall-based sensing elements, or the like). Notably, the use of diverse angle measurement paths 104/1006 provided by the sets of sensing elements 202/204 provides both redundancy of angle measurement and diversity of sensing principle, thereby enhancing functional safety of the angle sensor 102.

An ADC 206 includes an analog-to-digital converter that converts analog signals from a set of sensing elements 202/204 to a digital signal. For example, ADC 206a may convert analog signals, received from the set of sensing elements 202, into digital signals to be processed by DSP 208a. As another example, ADC 206b may convert analog signals, received from the set of sensing elements 204, into digital signals to be processed by DSP 208b. As another example, an ADC 206ab (e.g., an ADC 206 shared by the angle measurement path 104 and the angle measurement path 106) may convert analog signals received from the set of sensing elements 202 and signals received from the set of sensing elements 204 into digital signals to be processed by DSP 208a and DSP 206b, respectively. In some implementations, the ADC 206 may provide the digital signals to a particular DSP 208.

In some implementations, the sensor 102 may include one or more ADCs 206. For example, as illustrated in the example shown in FIG. 2A, the angle measurement path 104 includes a single ADC 206a and the angle measurement path 106 includes a single ADC 206b in some implementations. Such an implementation provides one ADC for angle measurement path 104 and angle measurement path 106. Therefore one of the ADCs failing will not prevent operation for both angle measurement path 104 and angle measurement path 106.

Figure 2A:
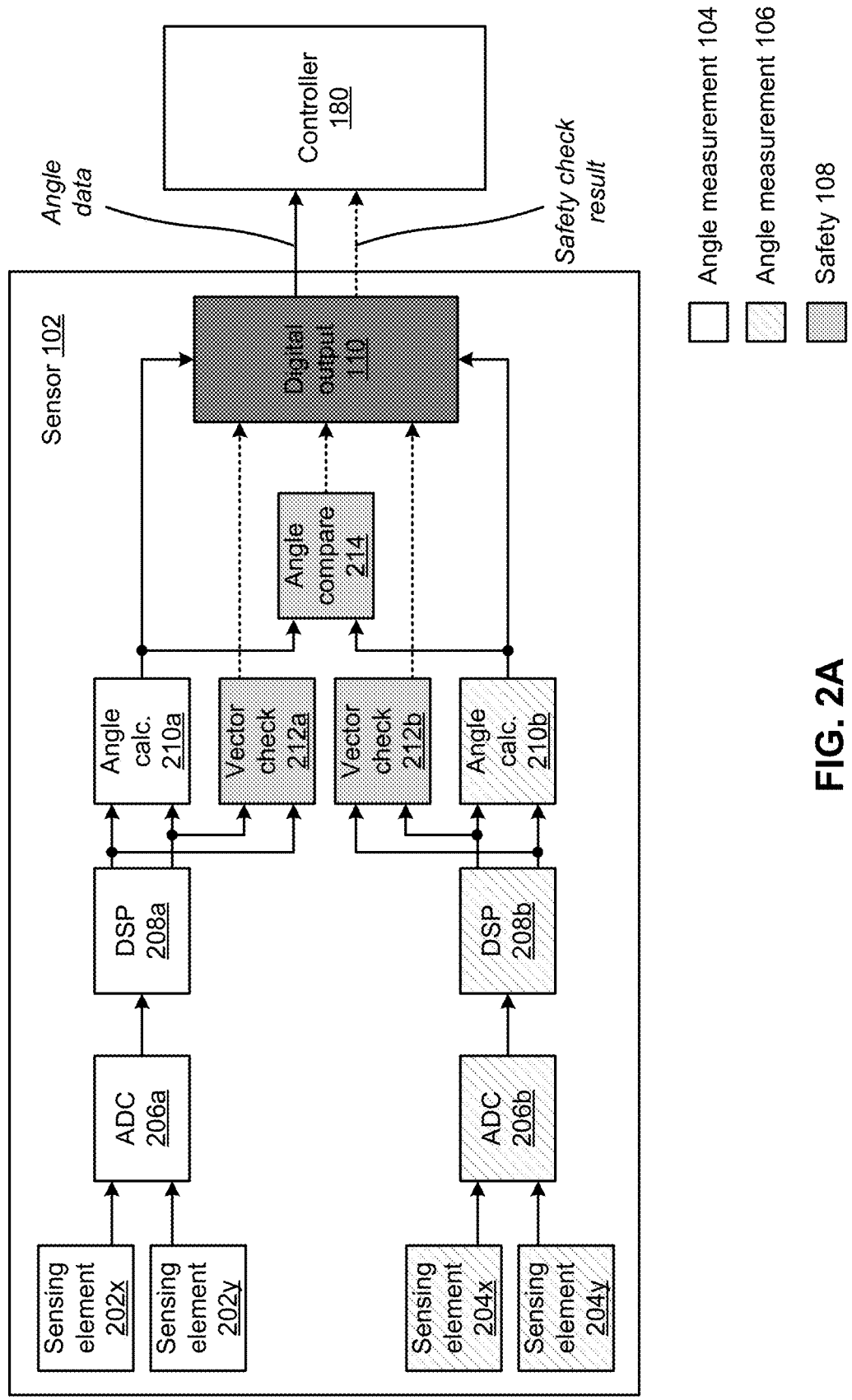
FIGS. 2A-2H are diagrams of example implementations of the system comprising the angle sensor including diverse measurement paths and a safety path, as described herein.
Figure 2B:
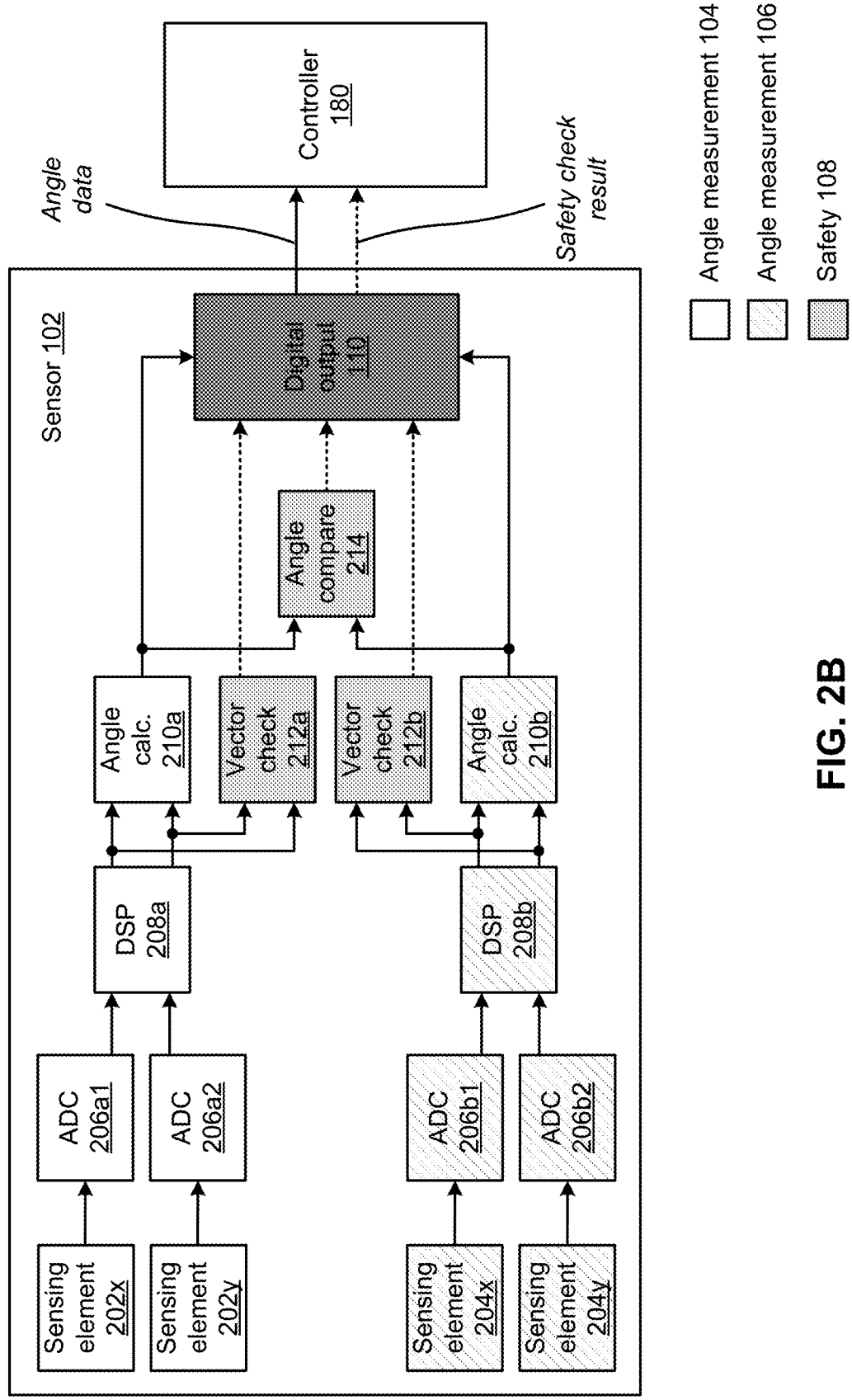

As another example, as illustrated in the example shown in FIG. 2B, the angle measurement path 104 may include an ADC 206a1 (e.g., configured to receive a signal from the sensing element 202x) and an ADC 206a2 (e.g., configured to receive a signal from the sensing element 202y), while the angle measurement path 106 may include an ADC 206b1 (e.g., configured to receive a signal from the sensing element 204x) and an ADC 206b2 (e.g., configured to receive a signal from the sensing element 204y). Such an implementation may avoid common cause failures by using individual ADCs for each angle sensing element within one individual angle measurement path.

Figure 2C:
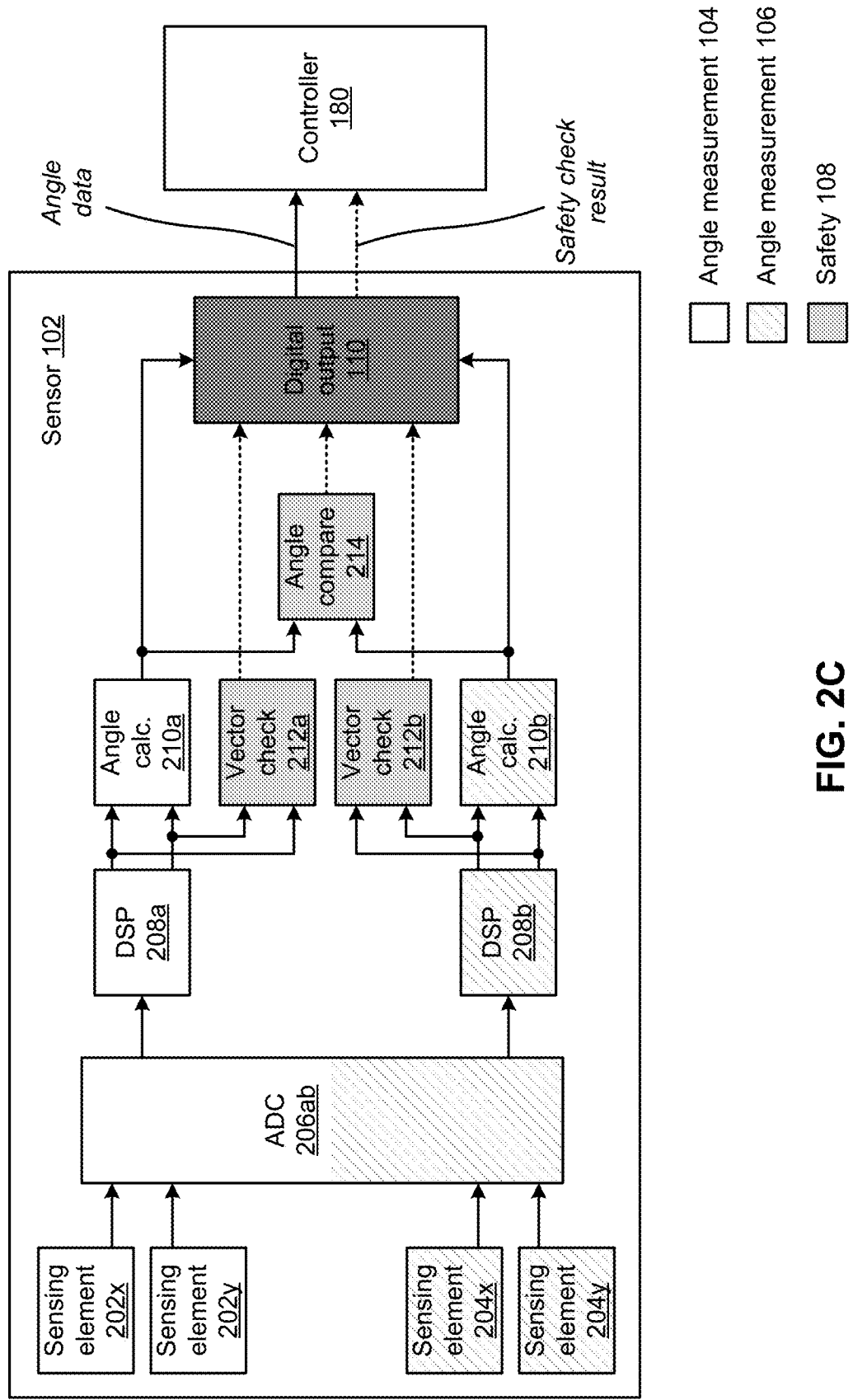

As another example, as illustrated in the example shown in FIG. 2C, the angle measurement path 104 and the angle measurement path 106 may share a single ADC 206ab. That is, in some implementations, the sensor 102 may include a multiplexed ADC 206ab used by both the angle measurement path 104 and the angle measurement path 106. Such an implementation may save in hardware effort complexity, as only one ADC and a multiplexer unit are required instead of two or even four ADCs, as discussed above. In this configuration, detection an error or malfunction—such as an offset error, a gain error, or a stuck-at error—is not readily available and in some implementations additional measures (not shown) may be utilized. Further, in the case of a different phase offset for the angle measurement paths 104 and 106, angle measurement paths 104 and 106 would show an identical angle error caused by the individual phase offsets. However, the two sine and two cosine signals will have different amplitudes at a given mechanical application angle, which will translate into an angle mismatch between the angle measurement paths 104 and 106. That is, a configuration (e.g., a reference direction, a phase offset, or the like) of the first angle measurement path 104 may in some implementations be different from a configuration of the second angle measurement path to enable an inherent verification of the operation of the ADC.

Figure 2D:
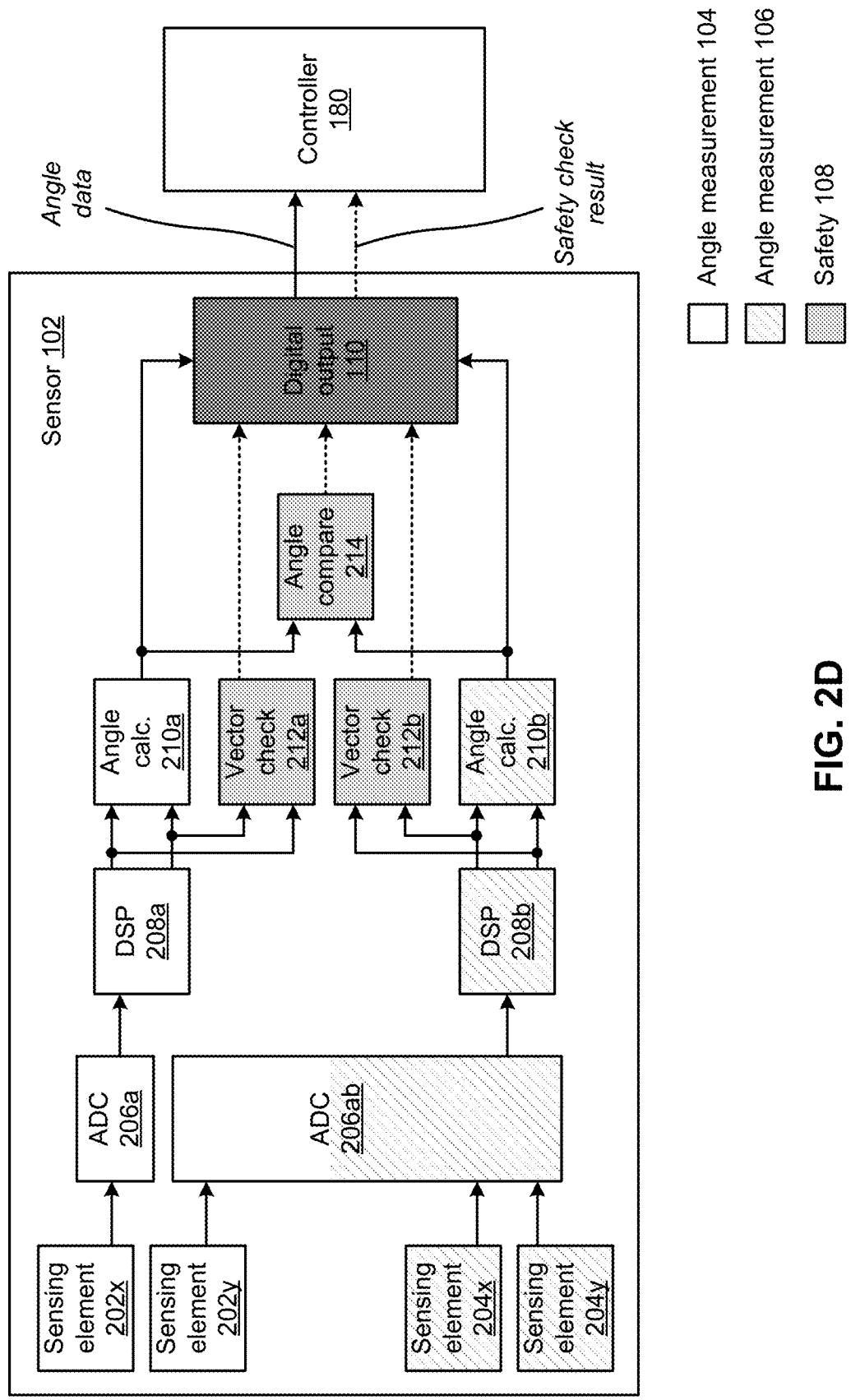
Figure 2E:
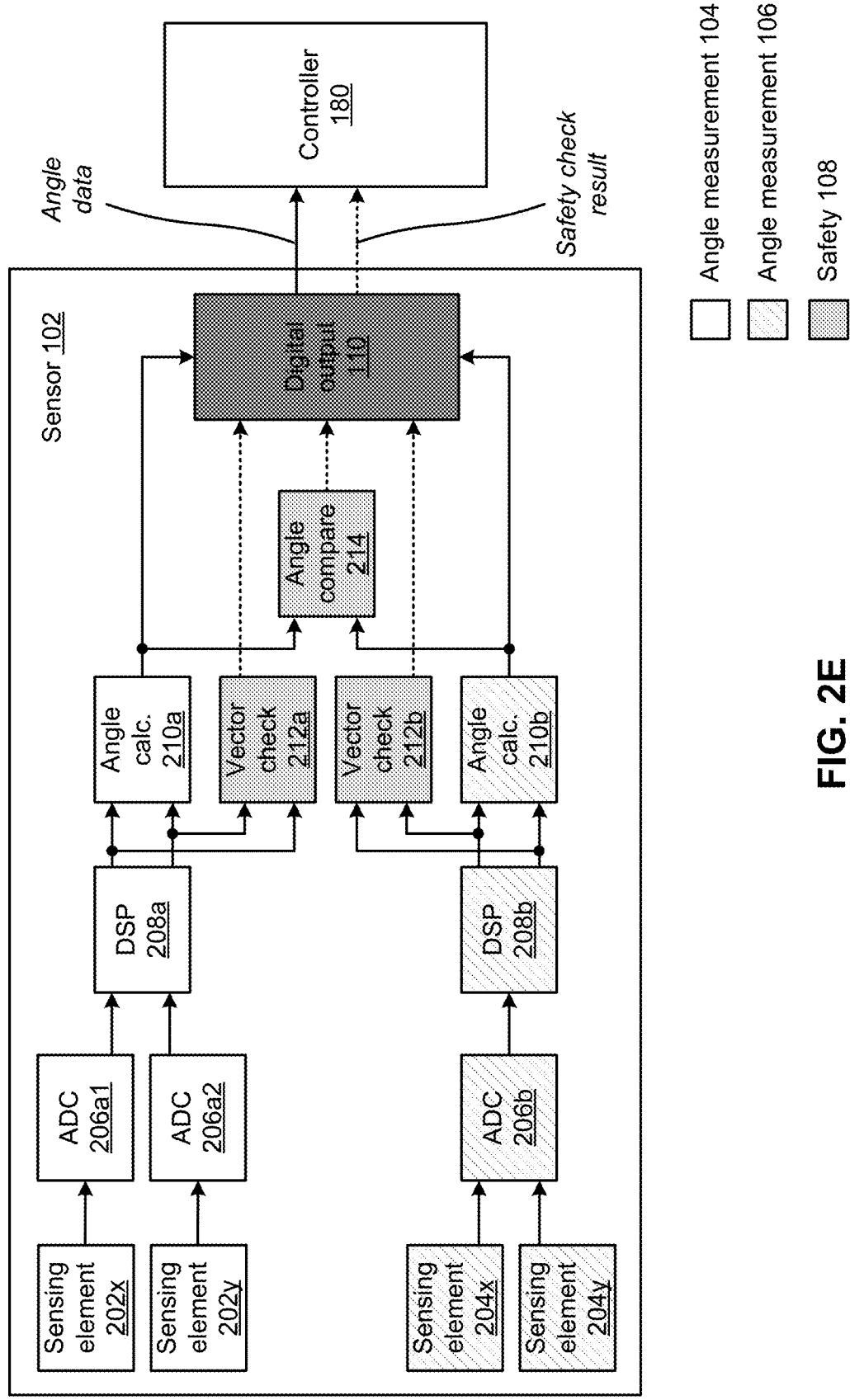
Figure 2F:
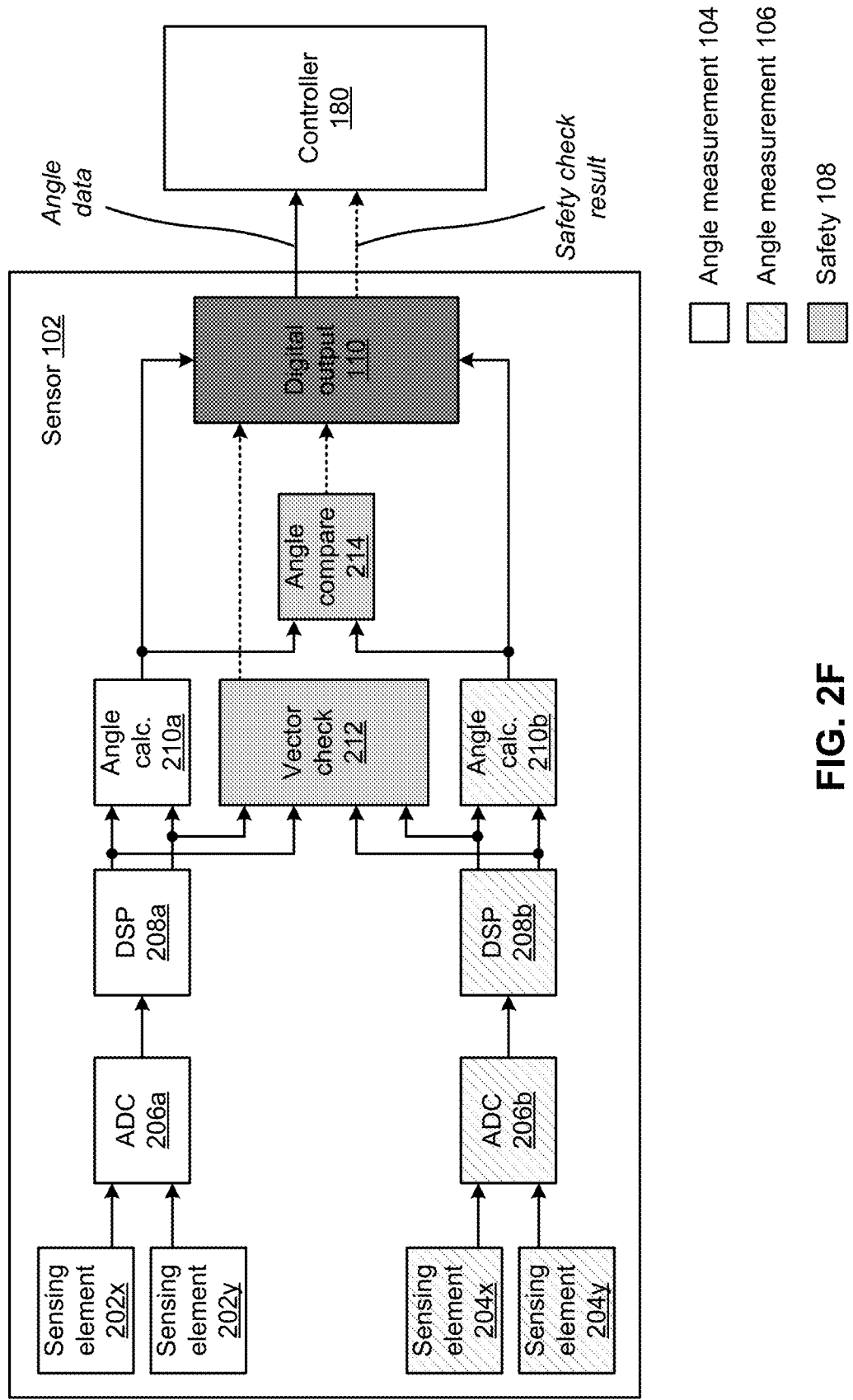
Figure 2G:
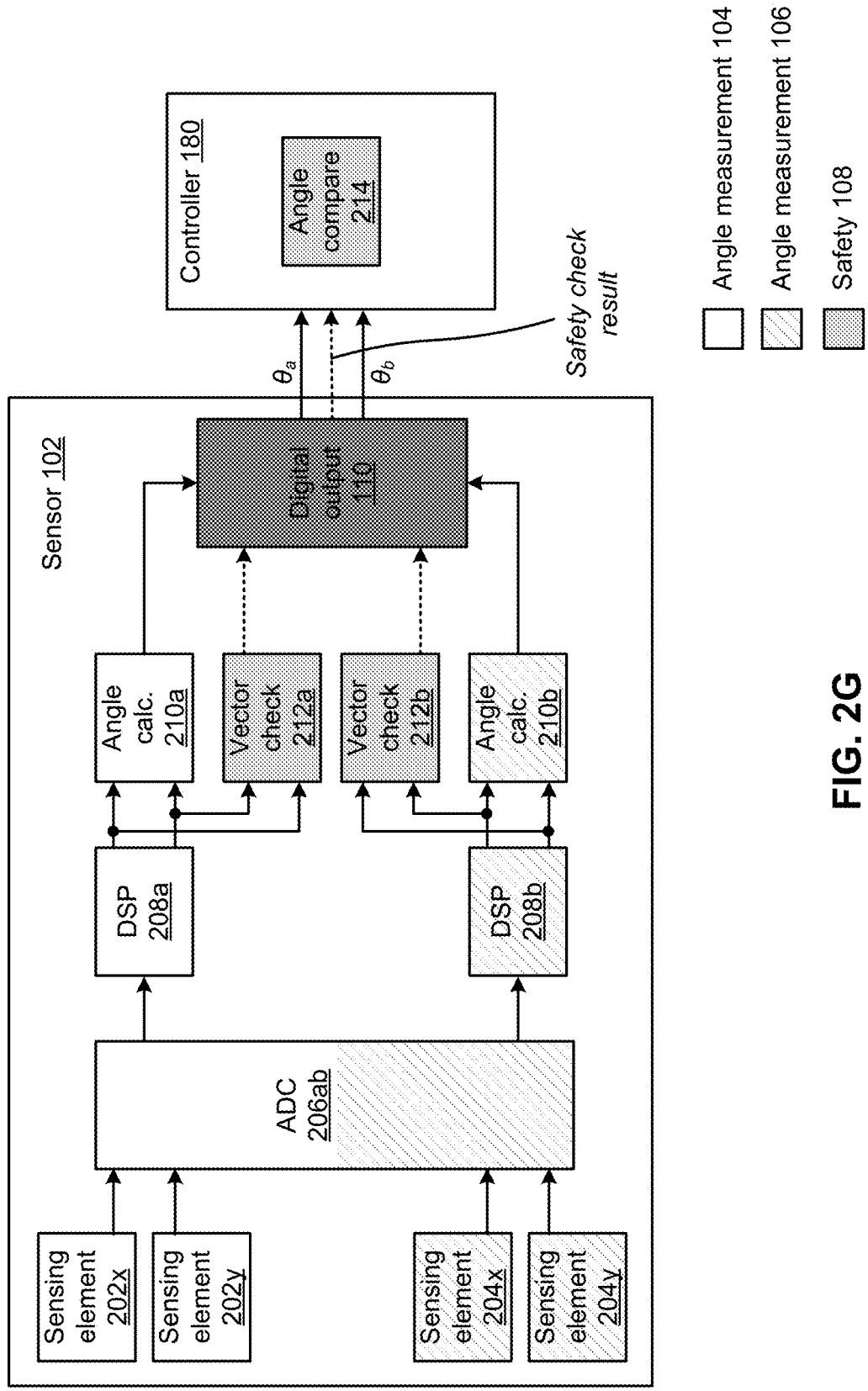

As another example, as illustrated in the example shown in FIG. 2D, the angle measurement path 104 may include an ADC 206a (e.g., configured to receive a signal from the sensing element 202x) and an ADC 206ab that is shared by the angle measurement path 104 and the angle measurement path 106 (e.g., the ADC 206ab may be configured to receive a signal from the sensing element 202y, the sensing element 204x, and the sensing element 204y). Such an implementation may benefit from hardware savings as ADC 206ab is used for three sensing elements 202y, 204x, and 204y, which reduces hardware complexity over three individual ADCs for each of these sensing elements. As mentioned above, ADC 206ab is single point of failures for the three sensing elements 202y, 204x, and 204y As another example, as illustrated in the example shown in FIG. 2E, the angle measurement path 104 may include an ADC 206a1 (e.g., configured to receive a signal from the sensing element 202x) and an ADC 206a2 (e.g., configured to receive a signal from the sensing element 202y), while the angle measurement path 106 may include an ADC 206b (e.g., configured to receive a signal from the sensing element 204x and a signal from the sensing element 204y). Such an implementation may be of interest when the system comprises high accuracy and slower sensing elements 202x, 202y, for example due to longer integration times required. Using such sensing elements in combination with a multiplexed ADC 206b would increase latency times caused by integration times even further as the multiplexed ADC 206b would be limited in its multiplexing frequency accordingly.

A DSP 208 (e.g., the DSP 208a, the DSP 208b) includes a digital signal processing device or a collection of digital signal processing devices. In some implementations, a given DSP 208 may receive digital signals from one or more ADCs 206 and may process the digital signals to form signals destined for the angle calculation component 210 or a vector length check component 212. For example, the DSP 208a may receive digital signals from one or more ADCs 206a and/or an ADC 206ab and may process the digital signals to form signals destined for the angle calculation component 210a or the vector length check component 212a. As another example, the DSP 208b may receive digital signals from one or more ADCs 206b and/or an ADC 206ab and may process the digital signals to form signals destined for the angle calculation component 210b or the vector length check component 212b.

A vector length check component 212 is a component configured to perform a vector length check for sensor values on a given angle measurement path. For example, the vector length check component 212a may be configured to perform the vector length check for the sensor values on the angle measurement path 104, and the vector length check component 212b may be configured to perform the vector length check for the sensor values on the angle measurement path 106. In some implementations, as illustrated in FIGS. 2A-2E, the safety path 108 includes a vector length check component 212a and a vector length check component 212b (e.g., the vector length check components 212 are separate components). Alternatively, as illustrated in the example shown in FIG. 2F, the sensor 102 may include a single vector length check component 212. That is, in some implementations, the sensor 102 includes a multiplexed vector length check component 212 used for vector length checks associated with both the angle measurement path 104 and the angle measurement path 106. The implementation of FIG. 2F uses a common vector check module 212 across angle measurement paths 104 and 106. Therefore, a cross-check between the angle measurement paths 104 and 106 becomes possible.

An angle comparison component 214 is a component configured to perform an comparison check of the angular position $\theta_a$ and the angular position $\theta_2$, as described above. In some implementations, the angle comparison component 214 is included in the sensor 102, as illustrated in the examples shown in FIG. 2A-2F. Alternatively, as illustrated in the examples shown in FIGS. 2F and 2G, the angle comparison component 214 is included on the controller 180. That is, in some implementations, the angle comparison component 214 is implemented external to the sensor 102 (e.g., at the controller 180). Put another way, in some implementations, the safety path 108 is configured partially on the controller 180. Such an implementation may benefit from the fact that the final angle comparison is done outside the sensor 102 at a central controller (e.g., controller 180). This implementation reflects a design choice in system partitioning. Further the angle comparison becomes independent form the sensor 102 and may therefore be implemented more performantly at lower cost within the controller 180.

Figure 2H:
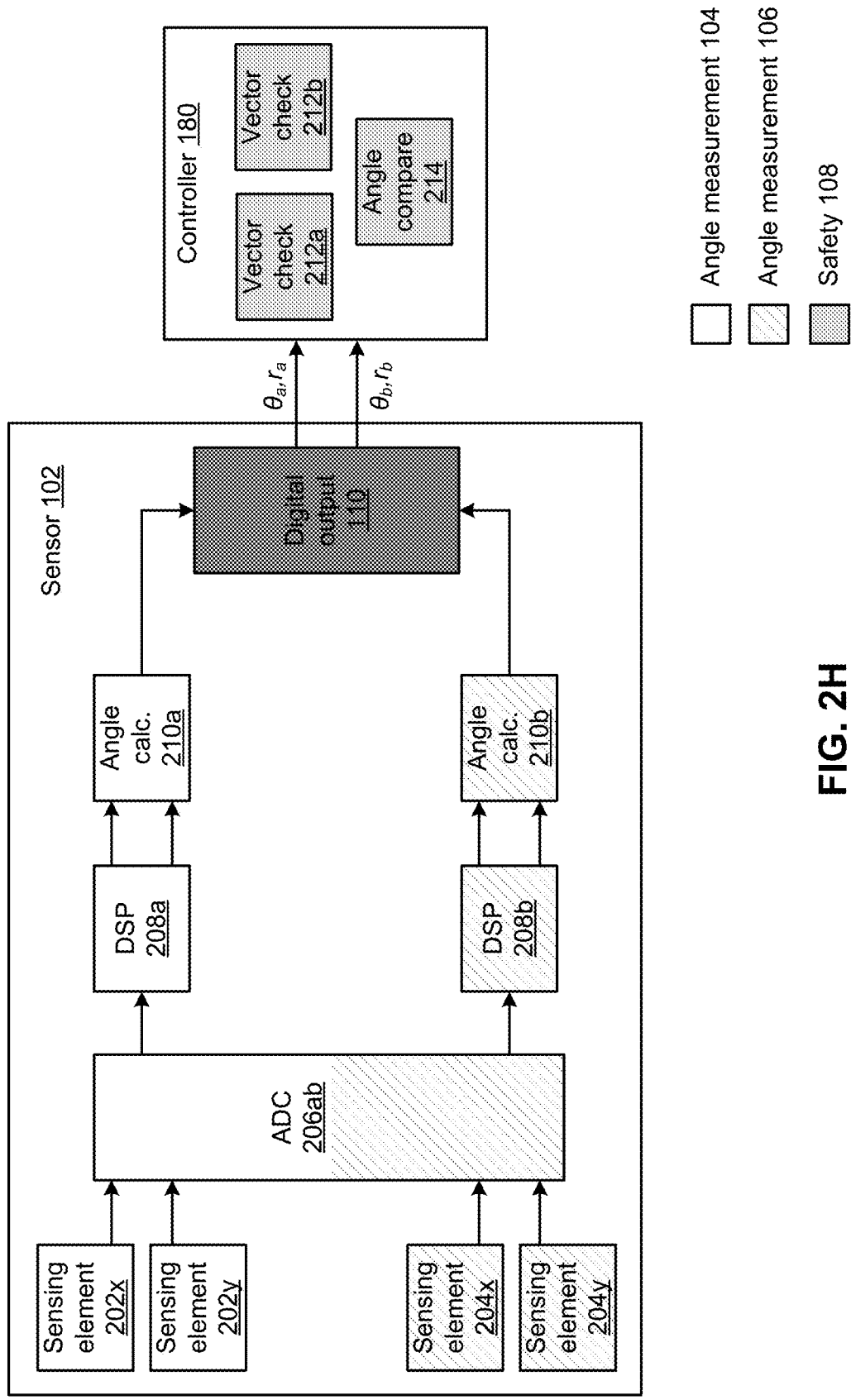

In some implementations, as illustrated in the example shown in FIG. 2H, the vector length check components 212 and the angle comparison component 214 are included on the controller 180. That is, in some implementations, the vector length check components 212 and the angle comparison component 214 are implemented external to the sensor 102 (e.g., at the controller 180). Put another way, in some implementations, the safety path 108 is configured on the controller 180. Such an implementation may benefit from full independence of all safety checks, in this example done by the controller 180.

As indicated above, FIGS. 2A-2H are provided as examples. Other examples may differ from what is described with regard to FIGS. 2A-2H. Further, the number and arrangement of components shown in FIGS. 2A-2H are provided as an example. In practice, there may be additional components, fewer components, different components, or differently arranged components than those shown in FIGS. 2A-2H. Furthermore, two or more components shown in FIGS. 2A-2H may be implemented within a single component, or a single component shown in FIGS. 2A-2H may be implemented as multiple, distributed components. Additionally, or alternatively, a set of components (e.g., one or more components) shown in FIGS. 2A-2H may perform one or more functions described as being performed by another set of components shown in FIGS. 2A-2H.

Figure 3:
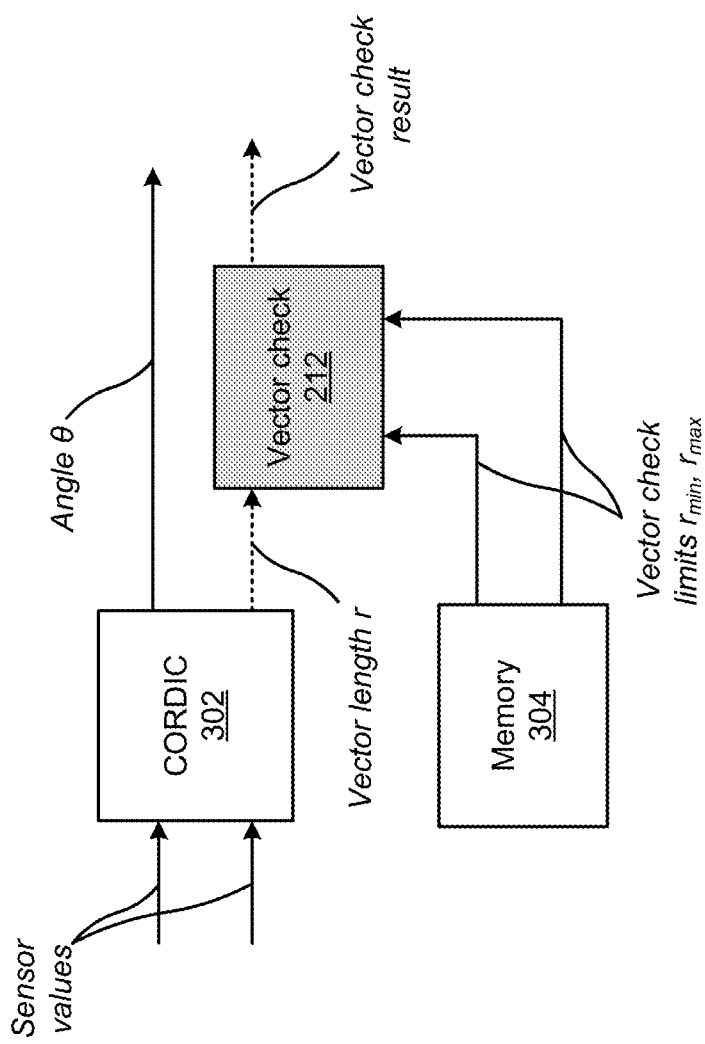
FIG. 3 is a diagram illustrating use of a single evaluation of a coordinate rotation digital compute algorithm for calculating an angular position and a vector length, as described herein.

In some implementations, an angular position $\theta$ (e.g., the angular position $\theta_a$, the angular position $\theta_b$) and a vector length r (e.g., the vector length $r_a$, the vector length $r_b$) are computed based on a single evaluation of a coordinate rotation digital compute (CORDIC) algorithm. That is, the angular position $\theta$ and the vector length r can in some implementations utilize a common evaluation of the CORDIC algorithm. FIG. 3 is a diagram illustrating use of a single evaluation of the CORDIC algorithm for calculating an angular position $\theta$ and a vector length r. In the example shown in FIG. 3, the CORDIC component 302 receives sensor values (e.g., from a DSP 208) and calculates the angular position $\theta$ and the vector length r in parallel. The CORDIC component 302 then provides an indication of the angular position $\theta$ (e.g., to the digital output component 110) and provides an indication of the vector length r (e.g., to a vector length check component 212). As further shown in FIG. 3, the vector length check component 212 obtains in indication of the minimum vector length $r_{min}$ (e.g., from memory 304) and an indication of the maximum vector length $r_{max}$, performs the vector length check (e.g., as described above), and provides an output indicating a result of the vector length check. In some implementations, the CORDIC component 302 may be implemented on, for example, the angle calculation component 210.

As indicated above, FIG. 3 is provided as an example. Other examples may differ from what is described with regard to FIG. 3. Further, the number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Notably, because the safety checks performed for the sensor 102 should be independent of a data path, communication of an indication of a result of the one or more safety checks (e.g., an error indication) should be independent of communication of the sensor data. This implies a certain independence in the protocol-encoder and error-indication to the controller 180. FIGS. 4A-4F are diagrams of example implementations for communicating an indication of a safety check result, described herein.

Figure 4A:
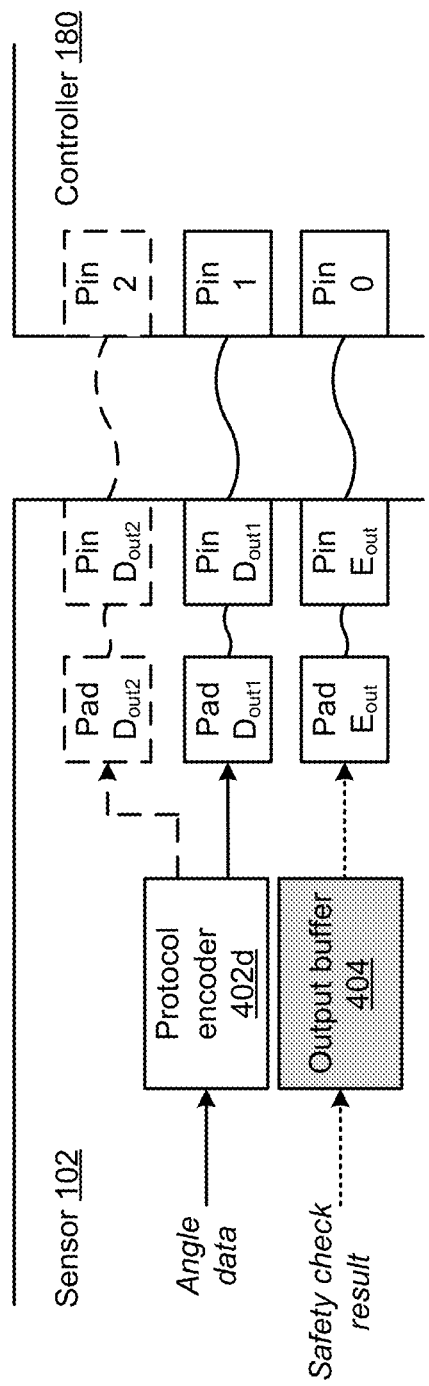
FIGS. 4A-4F are diagrams of example implementations for communication of an indication of a safety check result, as described herein.

FIG. 4A illustrates an example implementation in which the indication of the safety check result is provided via a pin dedicated to error signaling. In such an implementation, the indication of the result of the safety check is provided via an output buffer 404 that is separate from a sensor data interface (e.g., that utilizes a protocol encoder 402d of the digital output component 110) and is communicated via a separate pin, as indicated in FIG. 4A. Such an implementation provides simplicity and independence of error indication from a sensor data transfer protocol.

Figure 4B:
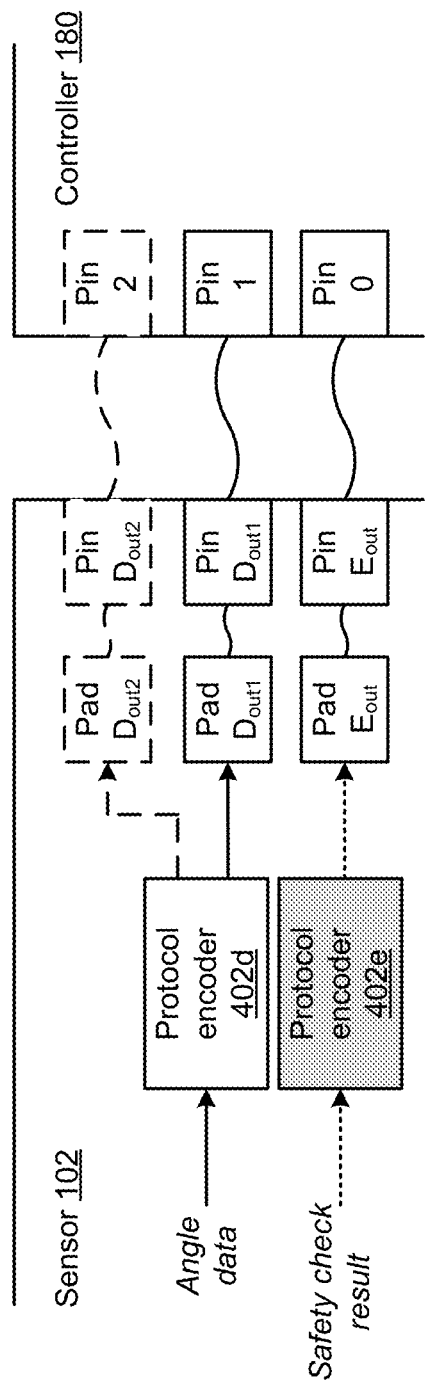

FIG. 4B illustrates an example implementation in which the indication of the safety check result is provided via an interface dedicated to error signaling and using a particular error protocol. In such an implementation, the indication of the result of the safety check is communicated via a separate error protocol (e.g., that utilizes a protocol encoder 402e of the digital output component 110). Here, the error protocol may have similar or lower complexity than the sensor data protocol (e.g., that utilizes the protocol encoder 402d). Such an implementation may enable use of a protocol capable of communicating comparatively more and differentiated error information and/or diagnostic information (e.g., as compared to the implementation shown in FIG. 4A).

Figure 4C:
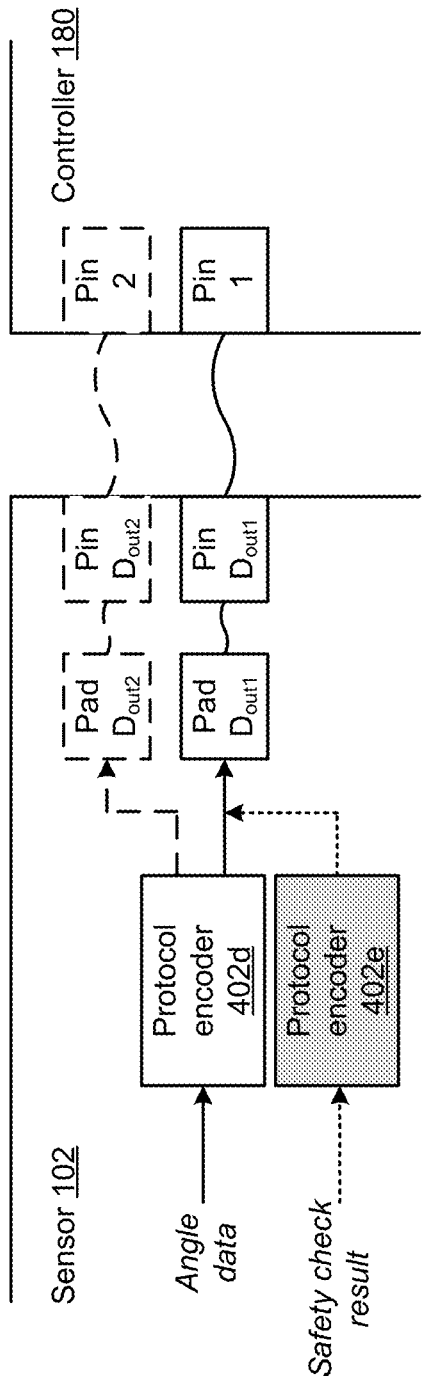
Figure 4D:

FIGS. 4C and 4D illustrate an example in which the indication of the safety check result is provided via a same interface as sensor data and using a protocol encoder dedicated to error signaling. In this case, the indication of the safety check result is communicated via the same output interface as the sensor data, but the dedicated protocol encoder 402e is able to insert the indication in the sensor data transfer protocol (e.g., that utilizes the protocol encoder 402d). FIG. 4D illustrates an example of a message format in such a scenario. Such an implementation may provide independence of the error protocol and the sensor data protocol without a need to increase a number of pins and wires utilized by the sensor 102.

Figure 4E:
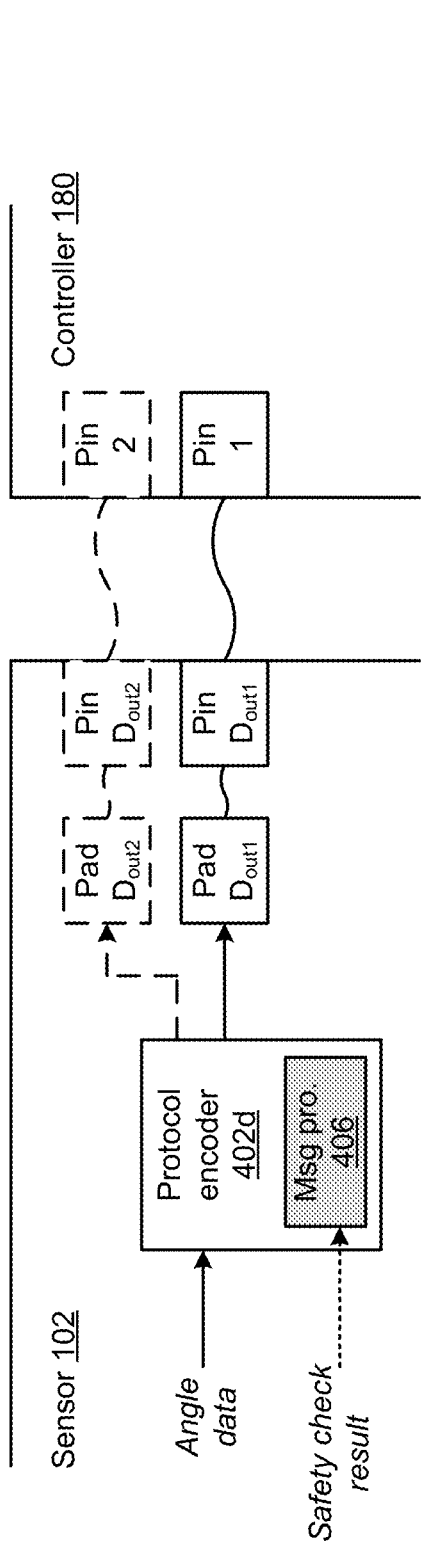
Figure 4F:
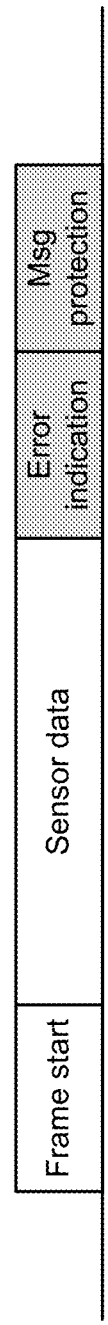

FIGS. 4E and 4F illustrate an example in which the indication of the safety check result is provided via a same interface as sensor data and a same protocol encoder as the sensor data, and includes a set of message protection bits. In this case, the indication of the safety check result is communicated to the controller 180 via the same interface as the sensor data and the communication of the indication of the safety check result is performed and analyzed according to safety standard rules. Such an implementation enables non-separated and single protocol generation without a need to increase a number of pins or wires utilized by the sensor 102. In some implementations, to ensure independence of the safety checks from the sensor data, an additional message protection may be implemented (e.g., by the message protection component 406 of the protocol encoder 406d). The additional message protection may include, for example, a set of cyclic redundancy check (CRC) bits. FIG. 4F illustrates an example of a message format in such a scenario.

As indicated above, FIGS. 4A-4F are provided as examples. Other examples may differ from what is described with regard to FIGS. 4A-4F. Further, the number and arrangement of components shown in FIGS. 4A-4F are provided as an example. In practice, there may be additional components, fewer components, different components, or differently arranged components than those shown in FIGS. 4A-4F. Furthermore, two or more components shown in FIGS. 4A-4F may be implemented within a single component, or a single component shown in FIGS. 4A-4F may be implemented as multiple, distributed components. Additionally, or alternatively, a set of components (e.g., one or more components) shown in FIGS. 4A-4F may perform one or more functions described as being performed by another set of components shown in FIGS. 4A-4F.

Figure 5:
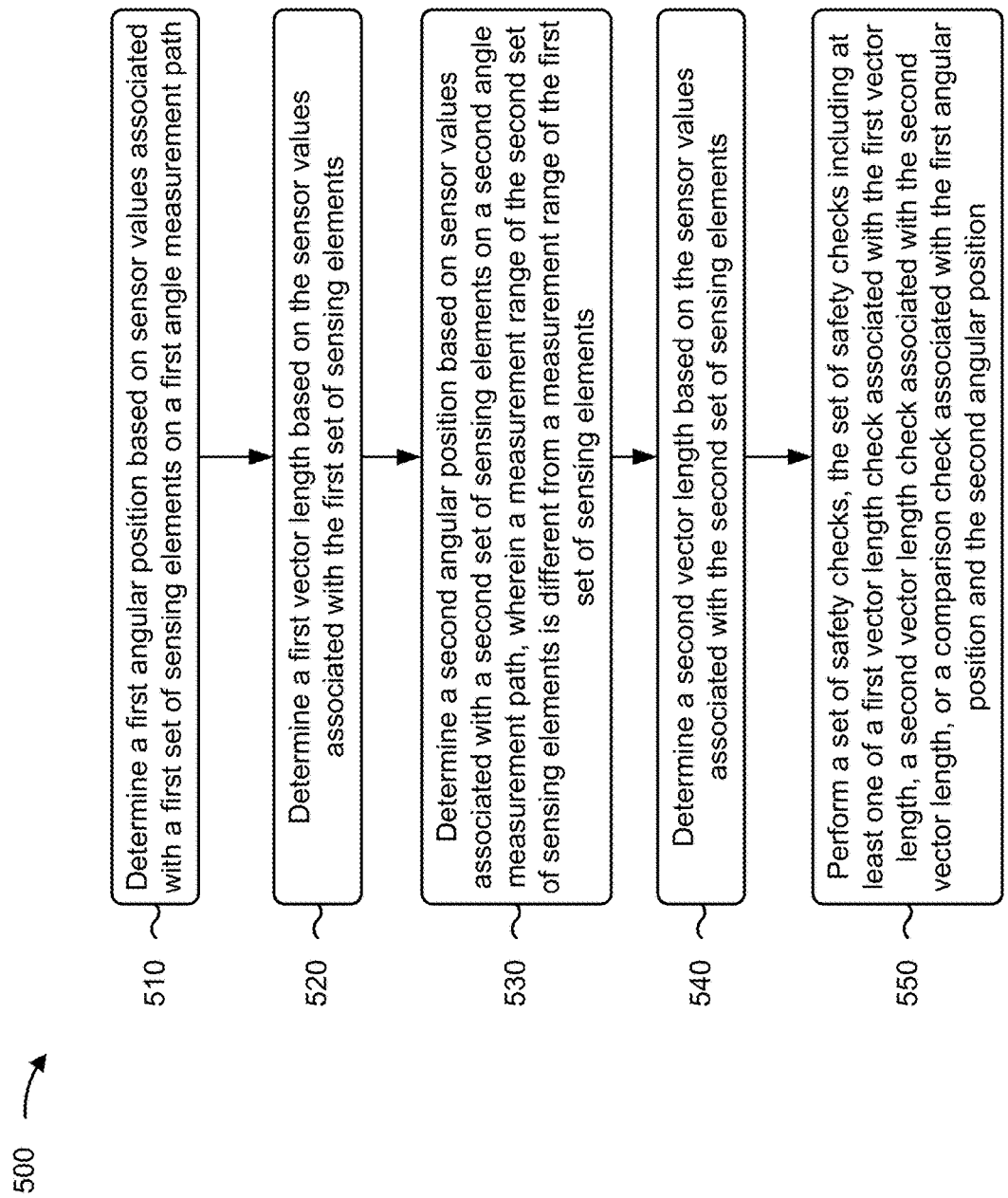
FIG. 5 is a flowchart of an example process relating to an angle sensor including diverse angle measurement paths and a safety path, as described herein.

FIG. 5 is a flowchart of an example process 500 relating to the angle sensor 102 including diverse angle measurement paths 104/106 and the safety path 108, as described herein. In some implementations, one or more process blocks of FIG. 5 may be performed by one or more devices of a system (e.g., the angle sensor 102 of the system 100 and/or the controller 180 of the system 100).

As shown in FIG. 5, process 500 may include determining a first angular position based on sensor values associated with a first set of sensing elements on a first angle measurement path (block 510). For example, the system (e.g., the angle sensor 102, the controller 180, or the like) may determine a first angular position based on sensor values associated with a first set of sensing elements (e.g., the set of sensing elements 202) on a first angle measurement path (e.g., the angle measurement path 104), as described above.

As further shown in FIG. 5, process 500 may include determining a first vector length based on the sensor values associated with the first set of sensing elements (block 520). For example, the system may determine a first vector length based on the sensor values associated with the first set of sensing elements, as described above.

As further shown in FIG. 5, process 500 may include determining a second angular position based on sensor values associated with a second set of sensing elements on a second angle measurement path, a measurement range of the second set of sensing elements being different from a measurement range of the first set of sensing elements (block 530). For example, the system may determine a second angular position based on sensor values associated with a second set of sensing elements (e.g., the set of sensing elements 204) on a second angle measurement path (e.g., the angle measurement path 106), as described above. In some implementations, a measurement range of the second set of sensing elements is different from a measurement range of the first set of sensing elements.

As further shown in FIG. 5, process 500 may include determining a second vector length based on the sensor values associated with the second set of sensing elements (block 540). For example, the system may determine a second vector length based on the sensor values associated with the second set of sensing elements, as described above.

As further shown in FIG. 5, process 500 may include performing a set of safety checks (block 550). For example, the system may perform a set of safety checks, as described above. In some implementations, the set of safety checks includes at least one of a first vector length check associated with the first vector length, a second vector length check associated with the second vector length, or a comparison check associated with the first angular position and the second angular position.

Process 500 may include additional implementations, such as any single implementation or any combination of implementations described below and/or in connection with one or more other processes described elsewhere herein.

In a first implementation, a measurement range on the first angle measurement path is different from a measurement range on the second angle measurement path.

In a second implementation, alone or in combination with the first implementation, the first set of sensing elements is a first set of MR sensing elements and the second set of sensing elements is a set of Hall-based sensing elements or is a second set of MR sensing elements.

In a third implementation, alone or in combination with one or more of the first and second implementations, at least one of the first angle measurement path or the second angle measurement path includes a plurality of ADCs.

In a fourth implementation, alone or in combination with one or more of the first through third implementations, the first angle measurement path and the second angle measurement path share an ADC.

In a fifth implementation, alone or in combination with one or more of the first through fourth implementations, at least one of the first angle measurement path or the second angle measurement path includes a single ADC.

In a sixth implementation, alone or in combination with one or more of the first through fifth implementations, the first angular position and the first vector length are computed based on a single evaluation of a CORDIC algorithm.

In a seventh implementation, alone or in combination with one or more of the first through sixth implementations, the second angular position and the second vector length are computed based on a single evaluation of a CORDIC algorithm.

In an eighth implementation, alone or in combination with one or more of the first through seventh implementations, an indication of a result of the set of safety checks is provided via a pin dedicated to error signaling.

In a ninth implementation, alone or in combination with one or more of the first through eighth implementations, an indication of a result of the set of safety checks is provided via an interface dedicated to error signaling and using a particular error protocol.

In a tenth implementation, alone or in combination with one or more of the first through ninth implementations, an indication of a result of the set of safety checks is provided via a same interface as sensor data and using a protocol encoder dedicated to error signaling.

In an eleventh implementation, alone or in combination with one or more of the first through tenth implementations, an indication of the result of the set of safety checks is provided via a same interface as sensor data and a same protocol encoder as the sensor data, and includes a set of message protection bits.

In a twelfth implementation, alone or in combination with one or more of the first through eleventh implementations, the first angle measurement path, the second angle measurement path, and the safety path are integrated on a monolithic semiconductor device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An angle sensor system, comprising:
a first set of sensing elements that is of a first type;
a second set of sensing elements that is of a second type that is different from the first type;
a first angle measurement path, including one or more first components, to determine a first angular position based on sensor values from the first set of sensing elements;
a second angle measurement path, including one or more second components, to determine a second angular position based on sensor values from the second set of sensing elements;
a safety check path to perform a set of safety checks, the set of safety checks including:
a first vector length check associated with the first angle measurement path via a first safety check path,
a second vector length check associated with the second angle measurement path via a second safety check path, and
a comparison check to determine whether a difference between with the first angular position and the second angular position is less than a threshold level; and
an output component to provide an indication of a result of the set of safety checks,
wherein at least one of:
the first angle measurement path and the second angle measurement path share a third component to determine the first angular position and the second angular position, respectively, or
the first safety check path and the second safety check path are associated with a fourth component associated with each of the first vector length check and the second vector length check, and
wherein the indication of the result of the set of safety checks is provided via at least one of:
a dedicated pin of a plurality of pins associated with an angle sensor,
a dedicated protocol encoder, or a message protection component, and wherein the plurality of pins includes one or more pins, other than the dedicated pin, associated with a sensor data transfer protocol.

2. The angle sensor system of claim 1, wherein a measurement range on the first angle measurement path is different from a measurement range on the second angle measurement path.

3. The angle sensor system of claim 1, wherein the first type is associated with a set of magnetoresistive (MR) sensing elements and the second type is associated with a set of Hall-based sensing elements.

4. The angle sensor system of claim 1, wherein the first type is associated with a first set of magnetoresistive (MR) sensing elements and the second type is associated with a second set of MR sensing elements that is of a different type.

5. The angle sensor system of claim 1, wherein the third component is an analog-to-digital converter (ADC).

6. The angle sensor system of claim 1, wherein the first angular position, the second angular position, and a vector length associated with the first angle measurement path are computed based on a single evaluation of a coordinate rotation digital compute (CORDIC) algorithm.

7. The angle sensor system of claim 1, wherein the indication of the result of the set of safety checks is provided via a pin dedicated to error signaling.

8. The angle sensor system of claim 1, wherein the indication of the result of the set of safety checks is further provided via an interface dedicated to error signaling and using a particular error protocol.

9. The angle sensor system of claim 1, wherein the indication of the result of the set of safety checks is further provided via a same interface as sensor data and using a protocol encoder dedicated to error signaling.

10. The angle sensor system of claim 1, wherein the indication of the result of the set of safety checks is further provided via a same interface as sensor data and a same protocol encoder as the sensor data, and wherein the indication of the result of the set of safety checks further includes a set of message protection bits.

11. The angle sensor system of claim 1, wherein the first angle measurement path, the second angle measurement path, and the safety check path are integrated on a monolithic semiconductor device.

12. The angle sensor system of claim 1, wherein at least one of the first vector length check or the second vector length check include:
determining whether a respective vector length, associated with at least one of the first vector length check or the second vector length check, stays within a range.

13. The angle sensor system of claim 5, wherein at least one of the first angle measurement path or the second angle measurement path includes an additional ADC.

14. The angle sensor system of claim 5, wherein a configuration of the first angle measurement path is different from a configuration of the second angle measurement path to enable an inherent verification of an operation of the ADC.

15. A system, comprising:
a first set of sensing elements that is of a first type associated with a first set of magnetoresistive (MR) sensing elements;
a second set of sensing elements that is of a second type that is different from the first type, wherein the second type is associated with either a set of Hall-based sensing elements or a second set of MR sensing elements that is of a different type compared to the first set of MR elements;
a first angle measurement path, including one or more first components, to determine a first angular position, the first angle measurement path including the first set of sensing elements;
a second angle measurement path, including one or more second components, to determine a second angular position, the second angle measurement path including the second set of sensing elements,
wherein the first angle measurement path and the second angle measurement path share a third component to determine the first angular position and the second angular position, respectively;
a safety check path to perform a comparison check to determine whether a difference between with the first angular position and the second angular position is less than a threshold level; and
an output component to provide an indication of a result of the safety check path,
wherein the indication of the result of the safety check path is provided via at least one of:
a dedicated pin of a plurality of pins associated with an angle sensor,
a dedicated protocol encoder, or
a message protection component, and
wherein the plurality of pins include one or more pins, other than the dedicated pin, associated with a sensor data transfer protocol.

16. The system of claim 15, wherein the first angle measurement path, the second angle measurement path, and the safety check path are integrated on a monolithic semiconductor device.

17. A method, comprising:
determining, by a first set of sensing elements of a system that is of a first type, sensor values,
wherein the first set of sensing elements is of a first type;
determining, by a second set of sensing elements of the system, sensor values,
wherein the second set of elements is of a second type that is different from the first type;
determining, by the system, a first angular position based on the sensor values associated with the first set of sensing elements on a first angle measurement path including one or more first components;
determining, by the system, a first vector length based on the sensor values associated with the first set of sensing elements;
determining, by the system, a second angular position based on the sensor values associated with the second set of sensing elements on a second angle measurement path including one or more second components,
wherein a measurement range of the second set of sensing elements is different from a measurement range of the first set of sensing elements;
determining, by the system, a second vector length based on the sensor values associated with the second set of sensing elements; and
performing, by the system, a set of safety checks via one or more safety check paths, the set of safety checks including:
a comparison check to determine whether a difference between with the first angular position and the second angular position is less than a threshold level, and at least one of:
- a first vector length check associated with the first vector length via a first safety check path of the one or more safety check paths, or
- a second vector length check associated with the second vector length via a second safety check path of the one or more safety check paths, wherein at least one of:
- the first angle measurement path and the second angle measurement path share a third component to determine the first angular position or the second angular position, respectively, or
- the first safety check path and the second safety check path are associated with a fourth component associated with each of the first vector length check and the second vector length check; and providing, by the system, an indication of a result of the set of safety checks, wherein the indication of the result is provided via at least one of:
- a dedicated pin of a plurality of pins,
- a dedicated protocol encoder, or
- a message protection component, and wherein the plurality of pins includes one or more pins, other than the dedicated pin, associated with a sensor data transfer protocol.

18. The system of claim 15, wherein a measurement range on the first angle measurement path is different from a measurement range on the second angle measurement path.

19. The method of claim 17, wherein a measurement range on the first angle measurement path is different from a measurement range on the second angle measurement path.

20. The method of claim 17, wherein the third component is an analog-to-digital converter (ADC).

* * * * *